United States Patent
Yi et al.

(10) Patent No.: US 11,798,747 B2
(45) Date of Patent: *Oct. 24, 2023

(54) MULTILAYER ELECTRONIC COMPONENT

(71) Applicant: SAMSUNG ELECTRO-MECHANICS CO., LTD., Suwon-si (KR)

(72) Inventors: Jae Seok Yi, Suwon-si (KR); Il Ro Lee, Suwon-si (KR); Chang Hak Choi, Suwon-si (KR); Bon Seok Koo, Suwon-si (KR); Jung Min Kim, Suwon-si (KR); Byung Woo Kang, Suwon-si (KR); San Kyeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,914

(22) Filed: Oct. 24, 2022

(65) Prior Publication Data

US 2023/0066593 A1     Mar. 2, 2023

Related U.S. Application Data

(63) Continuation of application No. 16/857,264, filed on Apr. 24, 2020, now Pat. No. 11,508,522.

(30) Foreign Application Priority Data

Dec. 18, 2019    (KR) .................. 10-2019-0169536

(51) Int. Cl.
*H01G 2/06*     (2006.01)
*H01G 4/008*     (2006.01)
(Continued)

(52) U.S. Cl.
CPC .............. *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC .......... H01G 2/06; H01G 2/065; H01G 4/008; H01G 4/012; H01G 4/1218; H01G 4/232;
(Continued)

(56) References Cited

U.S. PATENT DOCUMENTS

2009/0135550 A1   5/2009   Umemoto et al.
2010/0039748 A1*   2/2010   Fujii ...................... H01G 4/224
                                                                                   361/274.1
(Continued)

FOREIGN PATENT DOCUMENTS

KR   10-2018-0084030 A   7/2018
KR   10-2019-0049479 A   5/2019
(Continued)

*Primary Examiner* — Timothy J Thompson
*Assistant Examiner* — Guillermo J Egoavil
(74) *Attorney, Agent, or Firm* — Morgan, Lewis & Bockius LLP

(57) ABSTRACT

A multilayer electronic component include a first non-conductive resin layer, extending between a conductive resin layer and an electrode layer of a first external electrode, and a second non-conductive resin layer extending between a conductive resin layer and an electrode layer of a second external electrode. The first non-conductive layer and the second non-conductive layer may be spaced apart from each other to suppress arc discharge and to improve bending strength.

15 Claims, 8 Drawing Sheets

(51) Int. Cl.
*H01G 4/012* (2006.01)
*H01G 4/12* (2006.01)
*H01G 4/30* (2006.01)

(58) Field of Classification Search
CPC .......... H01G 4/30; H01G 4/12; H01G 4/2325;
H01G 4/0085; H01G 4/224; H05K 1/111;
H05K 1/181
USPC ......... 361/306.3, 321.2, 301.4, 321.5, 321.4;
174/260
See application file for complete search history.

(56) References Cited

U.S. PATENT DOCUMENTS

| | | |
|---|---|---|
| 2010/0302704 A1 | 12/2010 | Ogawa et al. |
| 2012/0327555 A1 | 12/2012 | Ahn et al. |
| 2014/0290999 A1 | 10/2014 | Park et al. |
| 2017/0032896 A1 | 2/2017 | Otani |
| 2017/0301468 A1* | 10/2017 | Kim .................. H01G 4/30 |
| 2019/0131076 A1* | 5/2019 | Fukumura ............... H01G 4/232 |
| 2023/0245832 A1* | 8/2023 | Take .................... H01G 4/2325 361/301.4 |

FOREIGN PATENT DOCUMENTS

| | | | | |
|---|---|---|---|---|
| KR | 20190116161 A | * | 10/2019 | ............... H01G 2/02 |
| KR | 20190121185 A | * | 10/2019 | ............. H01G 4/008 |

* cited by examiner

I - I'

MULTILAYER ELECTRONIC COMPONENT

CROSS-REFERENCE TO RELATED APPLICATION(S)

This application is the continuation application of U.S. patent application Ser. No. 16/857,264 filed on Apr. 24, 2020, which claims the benefit of priority to Korean Patent Application No. 10-2019-0169536 filed on Dec. 18, 2019 in the Korean Intellectual Property Office, the entire disclosure of which is incorporated herein by reference.

BACKGROUND

1. Field

The present disclosure relates to a multilayer electronic component.

2. Description of Related Art

A multilayer ceramic capacitor (MLCC), a type of multilayer electronic component, may be a chip type capacitor mounted on a printed circuit board of various electronic products such as imaging devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacitance, and relative ease of mounting. As various electronic devices such as computers, mobile devices, or the like are miniaturized and increased in terms of output, demand for miniaturization and high capacitance of multilayer ceramic capacitors is increasing.

In addition, as recent interest in vehicle electric/electronic components has increased, multilayer ceramic capacitors have also come to require relatively high reliability and strength characteristics to be used in vehicle or infotainment systems.

In order to secure high-reliability and high-strength characteristics, a method of changing a conventional external electrode, including an electrode layer, to have a double-layer structure including an electrode layer and a conductive resin layer has been proposed.

In the double-layer structure including the electrode layer and the conductive resin layer, a resin composition, including a conductive material, is applied onto the electrode layer to absorb external impacts and to prevent permeation of plating liquid. As a result, reliability may be improved.

However, since the standards for high reliability and high strength characteristics required by the industry are increasing, there is demand for a method of further improving high reliability and high strength characteristics.

In addition, since a case, in which a multilayer ceramic capacitor is used under a high voltage, is increasing, there is a need for a method of preventing an arc discharge from occurring between ends of band portions of an external electrode.

SUMMARY

An aspect of the present disclosure is to provide a multilayer electronic component, capable of suppressing arc discharge.

Another aspect of the present disclosure is to provide a multilayer electronic component having improved bending strength characteristics.

Another aspect of the present disclosure is to provide a multilayer electronic component having improved heat resistance.

Another aspect of the present disclosure is to provide a multilayer electronic component having improved moisture resistance reliability.

Another aspect of the present disclosure is to provide a multilayer electronic component having low equivalent series resistance (ESR) achieved by improving electrical connectivity between an electrode layer and a conductive resin layer.

However, the objects of the present disclosure are not limited to the above description, and will be more easily understood in the process of describing specific embodiments of the present disclosure.

According to an aspect of the present disclosure, a multilayer electronic component includes a body including dielectric layers, and first and second internal electrodes alternately stacked with respective dielectric layers interposed therebetween, and having first and second surfaces opposing each other in a stacking direction, third and fourth surfaces connected to the first and second surfaces and opposing each other, and fifth and sixth surfaces connected to the first to fourth surfaces and opposing each other, a first external electrode including a first electrode layer connected to the first internal electrode and a first conductive resin layer disposed on the first electrode layer, and having a first connection portion disposed on the third surface of the body and a first band portion extending from the first connection portion along a portion of each of the first, second, fifth, and sixth surfaces, a second external electrode including a second electrode layer connected to the second internal electrode and a second conductive resin layer disposed on the second electrode layer, and having a second connection portion disposed on the fourth surface of the body and a second band portion extending from the second connection portion along a portion of each of the first, second, fifth, and sixth surfaces, and first and second non-conductive resin layers disposed on the first, second, fifth, and sixth surfaces and spaced apart from each other. The first non-conductive resin layer extends between the first conductive resin layer and the first electrode layer of the first band portion, and the second non-conductive resin layer extends between the second conductive resin layer and the second electrode layer of the second band portion.

According to another aspect of the present disclosure, a multilayer electronic component includes a body including dielectric layers, and first and second internal electrodes alternately stacked with respective dielectric layers interposed therebetween, and having first and second surfaces opposing each other in a stacking direction, third and fourth surfaces connected to the first and second surfaces and opposing each other, and fifth and sixth surfaces connected to the first to fourth surfaces and opposing each other, a first external electrode including a first electrode layer connected to the first internal electrode and a first conductive resin layer disposed on the first electrode layer, a second external electrode including a second electrode layer connected to the second internal electrode and a second conductive resin layer disposed on the second electrode layer, and first and second non-conductive resin layers disposed on the first, second, fifth, and sixth surfaces and spaced apart from each other. The first non-conductive resin layer extends between the first conductive resin layer and the first electrode layer, and the second non-conductive resin layer extends between the second conductive resin layer and the second electrode layer. The first non-conductive resin layer includes one or more first openings through which a portion of the first electrode layer is exposed to the first conductive resin layer, and the second non-conductive resin layer includes one or more second openings through which a portion of the second electrode layer is exposed to the second conductive resin layer.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
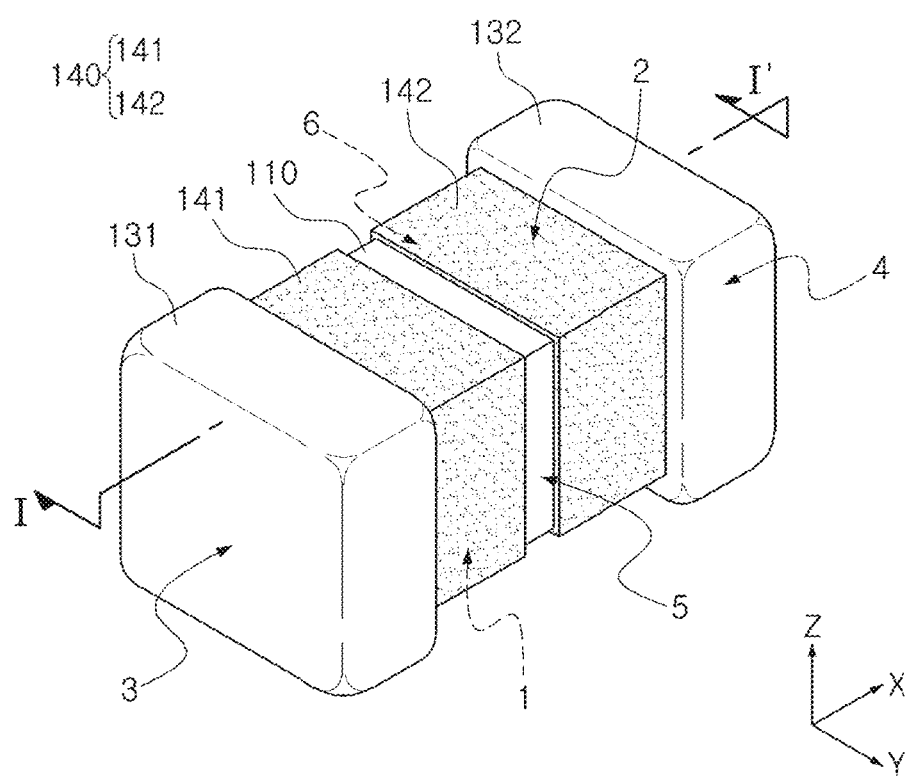
FIG. 1 is a schematic perspective view of a multilayer electronic component according to an exemplary embodiment of the present disclosure.

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinarily skilled artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawing, an X direction may be defined as a second direction, an L direction, or a longitudinal direction, a Y direction may be defined as a third direction, a W direction, or a width direction, and a Z direction may be defined as a first direction, a stacking direction, a T direction, or a thickness direction.

Multilayer Electronic Component

FIG. 1 is a schematic perspective view of a multilayer electronic component according to an exemplary embodiment of the present disclosure.

Figure 2:
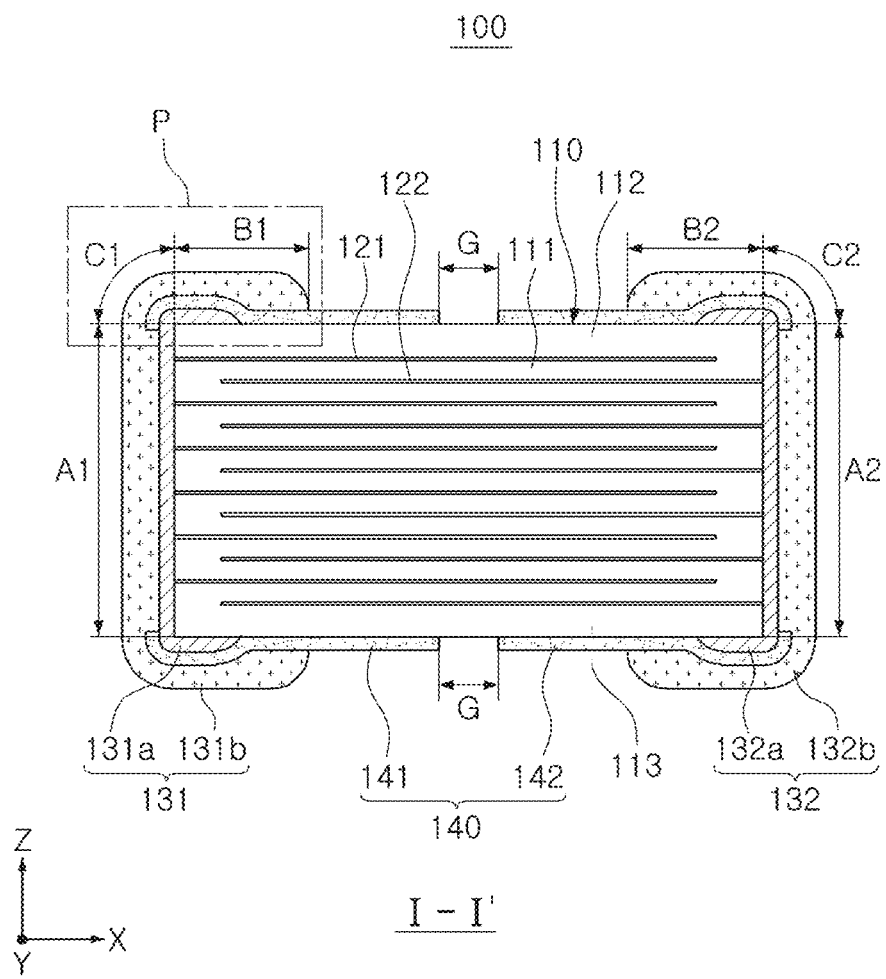
FIG. 2 is a cross-sectional view taken along line I-I' in FIG. 1.

FIG. 2 is a cross-sectional view taken along line I-I' in FIG. 1.

Figure 3:
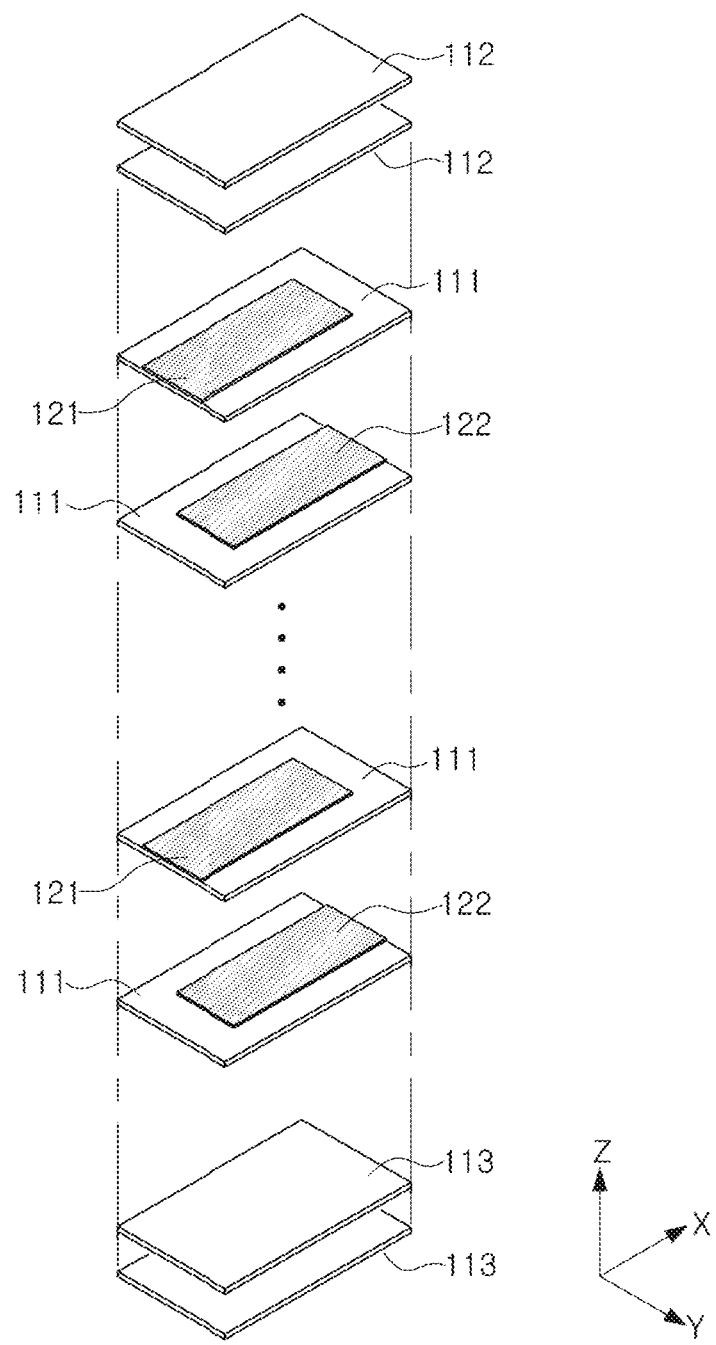
FIG. 3 is a schematic exploded perspective view of a body in which dielectric layers and internal electrodes are laminated according to an exemplary embodiment of the present disclosure.

FIG. 3 is a schematic exploded perspective view of a body in which dielectric layers and internal electrodes are laminated according to an exemplary embodiment.

Figure 4:
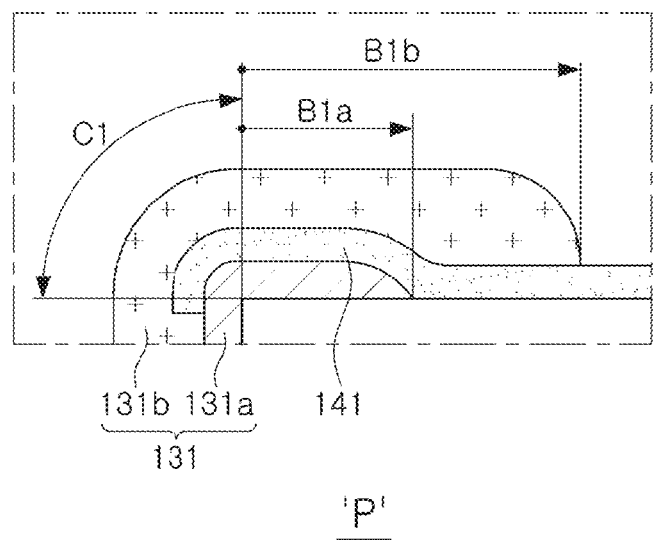
FIG. 4 is an enlarged view of region P in FIG. 2.

FIG. 4 is an enlarged view of region P in FIG. 2.

Hereinafter, a multilayer electronic component 100 according to an exemplary embodiment will be described with reference to FIGS. 1 to 4.

A multilayer electronic component 100 according to an exemplary embodiment may include a body 110 including dielectric layers 111, and first and second internal electrodes 121 and 122 alternately laminated with respective dielectric layers interposed therebetween, and having first and second surfaces 1 and 2 opposing each other in a stacking direction (e.g., a Z direction), third and fourth surfaces 3 and 4 connected to the first and second surfaces 1 and 2 and opposing each other, and fifth and sixth surfaces 5 and 6 connected to the first to fourth surfaces 1, 2, 3, and 4 and opposing each other, a first external electrode 131 including a first electrode layer 131a connected to the first internal electrode 121 and a first conductive resin layer 131b disposed on the first electrode layer 131a, and having a first connection portion A1 disposed on the third surface 3 of the body 110 and a first band portion B1 extending from the first connection portion A1 to a portion of each of the first, second, fifth, and sixth surfaces 1, 2, 5, and 6, a second external electrode 132 including a second electrode layer 132a connected to the second internal electrode 122 and a second conductive resin layer 132b disposed on the second electrode layer 132a, and having a second connection portion A2 disposed on the fourth surface 4 of the body 110 and a second band portion B2 extending from the second connection portion A2 to a portion of each of the first, second, fifth, and sixth surfaces 1, 2, 5, and 6, first and second non-conductive resin layers 141 and 142 disposed on the first, second, fifth, and sixth surfaces 1, 2, 5, and 6 and spaced apart from each other. The first non-conductive resin layer 141 is disposed to extend between the first conductive resin layer 131b and the first electrode layer 131a of the first band portion B1, and the second non-conductive resin layer 142 is disposed to extend between the second conductive resin layer 132b and the second electrode layer 132a of the second band portion B2.

In the body 110, the dielectric layers 111 and the internal electrodes 121 and 122 are alternately laminated.

The body 110 is not limited in shape, but may have a hexahedral shape or a shape similar thereto. Due to shrinkage of ceramic powder particles included in the body 110 during sintering, the body 110 may have a substantially hexahedral shape rather than a hexahedral shape having complete straight lines.

The body 110 may have the first and second surfaces 1 and 2 opposing each other in a thickness direction (e.g., a Z direction), the third and fourth surfaces 3 and 4 connected to the first and second surfaces 1 and 2 and opposing each other in a length direction (e.g., an X direction), and the fifth and sixth surfaces 5 and 6 connected to the first and second surfaces 1 and 2 and as well as to the third and fourth surfaces 3 and 4 and opposing each other in a width direction (e.g., an Y direction).

The plurality of dielectric layers 111, constituting the body 110, is in a sintered state and may be integrated with each other such that boundaries therebetween may not be readily apparent without using a scanning electron microscope (SEM).

According to an exemplary embodiment, a raw material forming the dielectric layer 111 is not limited as long as sufficient capacitance may be obtained. For example, the raw material forming the dielectric layer 111a may a barium titanate-based material, a lead composite perovskite-based material, a strontium titanate-based material, or the like. The barium titanate-based material may include $BaTiO_3$-based ceramic powder particles. The $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, prepared by partially employing calcium (Ca), zirconium (Zr), and the like, in $BaTiO_3$.

Various ceramic additives, organic solvents, plasticizers, binders, dispersants, or the like, may be added to the powder particles of barium titanate ($BaTiO_3$), or the like, according to the purpose of the present disclosure, as the material for forming the dielectric layer 111. The ceramic additive may include transition metal oxides or carbides, rare earth elements, magnesium (Mg), aluminum (Al), or the like The body 110 may have a capacitance forming portion disposed in the body 110 and including the first and second internal electrode layers 121 and 122, disposed to oppose each other with the dielectric layer 111 interposed therebetween, to form capacitance, and upper and lower protective layers 112 and 113 disposed above and below the capacitance forming portion.

The capacitance forming portion may contribute to capacitance formation of a capacitor, and may be formed by repeatedly laminating the plurality of first and second internal electrode layers 121 and 122 with the dielectric layer 111 interposed therebetween.

The upper protective layer 112 and the lower protective layer 113 may be formed by laminating a single dielectric layer or two or more dielectric layers on upper and lower surfaces of the capacitance forming portion, respectively, in the vertical direction, and may basically play a role in preventing damage to the internal electrodes due to physical or chemical stress.

The upper protective layer 112 and the lower protective layer 113 may not include an internal electrode, and may include the same material as the dielectric layer 111.

The internal electrodes 121 and 122 may be disposed to oppose each other with the dielectric layer 111 interposed therebetween.

The internal electrodes 121 and 122 may include first and second internal electrodes 121 and 122 alternately disposed to oppose each other with respective dielectric layers interposed therebetween.

The first and second internal electrode layers 121 and 122 may be exposed to the third and fourth surfaces 3 and 4 of the body 110, respectively.

Referring to FIG. 2, the first internal electrode 121 may be spaced apart from the fourth surface 4 and may be exposed through the third surface 3, and the second internal electrode 122 may be spaced apart from the third surface 3 and may be exposed through the fourth side 4. The first external electrode 131 may be disposed on the third surface 3 of the body 110 to be connected to the first internal electrode 121, and the second external electrode 132 may be disposed on the fourth surface 4 of the body 110 to be connected to the internal electrode 122.

For example, the first internal electrode 121 is not connected to the second external electrode 132 and is connected to the first external electrode 131, and the second internal electrode 122 is not connected to the first external electrode 131 and is connected to the second external electrode 132. Accordingly, the first internal electrode 121 is spaced apart from the fourth surface 4 by a predetermined distance, and the second internal electrode 122 is spaced apart from the third surface 3 by a predetermined distance.

The first and second internal electrode layers 121 and 122 may be electrically isolated from each other by the dielectric layer 111 disposed therebetween.

Referring to FIG. 3, the body 110 may be formed by alternately laminating a dielectric layer 111, on which a first internal electrode 121 is printed, and a dielectric layer 111, on which a second internal electrode 122 is printed, in a thickness direction (e.g., Z direction) and sintering the laminated dielectric layers 111.

A material of the internal electrodes 121 and 122 is not necessarily limited, and may be a material having improved electrical conductivity. For example, the internal electrodes 121 and 122 may be formed by printing an internal electrode conductive paste, including at least one of nickel (Ni), copper (Cu), palladium (Pd), silver (Ag), gold (Au), platinum (Pt), tin (Sn), and tungsten (W), titanium (Ti), and alloys thereof, on a ceramic green sheet.

A method of printing the internal electrode conductive paste may be a screen-printing method or a gravure printing method, but is not limited thereto.

The external electrodes 131 and 132 are disposed on the body 110 and include electrode layers 131a and 132a and conductive resin layers 131b and 132b.

The external electrodes 131 and 132 may include first and second external electrodes 131 and 132, respectively connected to the first and second internal electrodes 121 and 122.

The first external electrode 131 may include a first electrode layer 131a and a first conductive resin layer 131b, and the second external electrode 132 may include a second electrode layer 132a and a second conductive resin layer 132b.

A region of the first external electrode 131 may be divided depending on a location thereof with reference to FIG. 2. The first external electrode 131 may have a first connection portion A1, disposed on the third surface 3 of the body 110, and a band portion B1 extending from the first connection portion A1 to a portion of the first, second, fifth, and sixth portions 1, 2, 5, and 6.

In addition, a region between the first connection portion A1 and the first band portion B1 may be defined as a first corner portion C1. For example, a portion of the first external electrode 131, disposed on the third surface 3 of the body 110, may referred to as a first connection portion A1, a portion of the first external electrode 131, disposed on the first, second, fifth, and sixth surfaces of the body 110, may be referred to as a first band portion B1, and a region of the first external electrode 131, disposed between the first connection portion A1 and the first band portion B1 may be referred to as a first corner portion C1.

A region of the second external electrode 131 may be divided depending on a location thereof. The second external electrode 132 has a second connection portion A2, disposed on the fourth surface 4 of the body 110, and a second band portion B2 extending from the second connection portion A2 to a portion of the first, second, fifth, and sixth surfaces 1, 2, 5, and 6.

In addition, a region between the second connection portion A2 and the second band portion B2 may be defined as a second corner portion C2. For example, a portion of the second external electrode 132, disposed on the fourth surface 4 of the body 110, may referred to as a second connection portion A1, a portion of the second external electrode 131, disposed on the first, second, fifth, and sixth surfaces of the body 110, may be referred to as a second band portion B2, and a region of the second external electrode 132, disposed between the second connection portion A2 and the second band portion B2 may be referred to as a second corner portion C2.

According to an exemplary embodiment of the present disclosure, in regions of the first and second connection portions A1 and A2 corresponding to the third and fourth surfaces 3, 4 of the body 110, a portion of the first electrode layer 131a may be in contact with first conductive resin layer 131b through an opening of the first non-conductive resin layer 141, and a portion of the second electrode layer 132a may be in contact with the second conductive resin layer 132b through an opening of the second non-conductive resin layer 142.

The external electrodes 131 and 132 may be formed of any material, as long as it has electrical conductivity, such as a metal. A detailed material of the external electrodes 131 and 132 may be selected in consideration of electrical characteristics, structural stability, and the like.

For example, each of the first and second electrode layers 131 and 132 may include a conductive meal and glass.

A conductive metal used for the electrode layers 131a and 132a is not necessarily limited as long as it may be electrically connected to the internal electrode to form capacitance. The conductive material may be, for example, at least one selected from the group consisting of nickel (Ni), copper (Cu), palladium (Pd), silver (Ag), gold (Au), platinum (Pt), tin (Sn), tungsten (W), titanium (Ti), and alloys thereof.

The electrode layers 131a and 132a may be formed by applying a conductive paste, prepared by adding a glass frit to conductive metal powder particles, and then sintering the conductive paste.

When the first and second electrode layers 131a and 132a include a conductive metal and glass, each of the corner portions C1 and C2, regions between the connection portions A1 and A2 and the band portions B1 and B2, may be formed to have a low thickness, or lifting may occur between ends of the bands B1 and B2 and the body 110 to deteriorate moisture resistance reliability. Accordingly, when the first and second electrode layers 131 and 132 include a conductive metal and glass, an effect of improving moisture resistance reliability may be improved.

The first and second electrode layers 131a and 132a may be formed by means of atomic layer deposition (ALD), molecular layer deposition (MLD), chemical vapor deposition (CVD), sputtering, or the like.

The first and second electrode layers 131a and 132a may be formed by transferring a sheet, including a conductive metal, to the body 110.

Each of the conductive resin layers 131b and 132b may include a conductive metal and a base resin.

The conductive metal, included in each of the conductive resin layers 131b and 132b, serve to electrically connect the conductive resin layers 131b and 132b to the electrode layers 131a and 132a.

The conductive metal, included in each of the electrode layers 131a and 132a, is not necessarily limited as long as it may be electrically connected to the internal electrode to form capacitance. The conductive material may be, for example, at least one selected from the group consisting of nickel (Ni), copper (Cu), palladium (Pd), silver (Ag), gold (Au), platinum (Pt), tin (Sn), tungsten (W), titanium (Ti), and alloys thereof.

The conductive metal, included in the conductive resin layers 131b and 132b, may include at least one of spherical powder particles and flake powder particles. For example, the conductive metal may include only flake powder particles, or spherical powder particles, or a mixture of flake powder particles and spherical powder particles.

The spherical powder particles may have an incompletely spherical shape and may have, for example, a shape in which a ratio of a length of a major axis to a length of a minor axis (the major axis/the minor axis) is 1.45 or less.

The flake powder particles refer to powder particles, each having a flat and elongated shape, and is not limited to a specific shape and, for example, a ratio of a length of a major axis and a length of a minor axis (the major axis/the minor axis) may be 1.95 or more.

The lengths of the major axes and the minor axes of the spherical powder particles and the flake powder particles may be measured from an image obtained by scanning a cross section (an L-T cross section), taken from a central portion of a multilayer electronic component in a width (Y) direction, in X and Z directions with a scanning electron microscope (SEM).

The base resin, included in the conductive resin layers 131b and 132b, serves to secure adhesion and to absorb impacts.

The base resin, included in the conductive resin layers 131b and 132b, is not necessarily limited as long as it has adhesion and impact absorption and is mixed with conductive metal powder particles to prepare a paste and may include, for example, an epoxy-based resin.

In addition, the conductive resin layer may include a plurality of metal particles, an intermetallic compound, and a base resin.

According to the present disclosure, the non-conductive resin layer 140, which includes the first and second non-conductive resin layers 141 and 142, may be disposed to extend between the electrode layers 131a and 132a and the conductive resin layers 131b and 132b, or a plurality of island-shaped adhesive portions 151 and 152 may be disposed on the first electrode layer 131a of the first connection portion A1 and the second electrode layer 132a of the second connection portion A2. Therefore, a contact area between the electrode layers 131a and 132a and the conductive resin layers 131b and 132b may be reduced. As a result, electrical connectivity between the electrode layers 131a and 132a and the conductive resin layers 131b and 132b may be deteriorated.

However, according to an exemplary embodiment, when each of the conductive resin layers 131b and 132b includes a plurality of metal particles, an intermetallic compound, and a base resin, stable electrical connectivity may be secured.

The intermetallic compound may serve to connect a plurality of metal particles to improve electrical connectivity, and may serve to surround and connect the plurality of metal particles to each other.

In this case, the intermetallic compound may include a metal having a melting point lower than a curing temperature of a base resin.

For example, since the intermetallic compound includes a metal having a melting point lower than the curing temperature of the base resin, the metal having a melting point lower than the curing temperature of the base resin is melted during drying and curing processes and forms an intermetallic compound with a portion of the metal particles to surround the metal particles. In this case, the intermetallic compound may include, in detail, a metal having a low melting point of 300É or less.

For example, the intermetallic compound may include tin (Sn) having a melting point of 213É to 220É. The tin (Sn) is melted during the drying and curing process, and the melted Sn wets high-melting metal particles having a high melting point such as Ag, Ni, or Cu due to capillarity and reacts with a portion of Ag, Ni, or Cu metal particles to form an intermetallic compound such as $Ag_3Sn$, $Ni_3Sn_4$, $Cu_6Sn_5$, $Cu_3Sn$, or the like. Ag, Ni or Cu, not participating in the reaction, remains in the form of metal particles.

Thus, the plurality of metal particles may include at least one of Ag, Ni, and Cu, and the intermetallic compound may include at least one of $Ag_3Sn$, $Ni_3Sn_4$, $Cu_6Sn_5$, and $Cu_3Sn$.

The external electrodes 131 and 132 may further include plating layers, not illustrated, disposed on the conductive resin layers 131b and 132b to improve mounting characteristics.

For example, the plating layer may be a Ni plating layer or a Sn plating layer, may have a form in which a Ni plating layer and a Sn plating layer are sequentially formed on the conductive resin layers 131b and 132b), or may include a plurality of Ni plating layers and/or a plurality Sn plating layers.

The non-conductive resin layer 140 includes first and second non-conductive resin layers 141 and 142.

The first and second non-conductive resin layers 141 and 142 are disposed on the first, second, fifth, and sixth surfaces 1, 2, 5, and 6 of the body 110 and are spaced apart from each other.

The first non-conductive resin layer 141 is disposed to extend between the first conductive resin layer 131b and the first electrode layer 131a of the first band portion B1, and the second non-conductive resin layer 142 is disposed to extend between the second conductive resin layer 132b and the second electrode layer 132a of the second band portion B2.

The non-conductive resin layer 140 serves to prevent stress, generated when a substrate is deformed by thermal and physical impacts while the multilayer electronic component 100 is mounted on the substrate, from propagating to the body 110 and to prevent cracking.

In addition, the non-conductive resin layer 140 blocks a moisture permeation path to improve moisture resistance reliability.

The base resin, included in the conductive resin layers 131b and 132b, also plays a role in absorbing impacts, but the role of the base resin is limited because the first resin layer 131b and the second conductive resin layer 132b should be disposed to be insulated.

In addition, when lengths of the first and second conductive resin layers 131b and 132b are increased to enhance bending stress, a short-circuit may occur between the first and second conductive resin layers 131b and 132b, and arc discharge may occur between ends of band portions of the first and second conductive resin layers 131b and 132b under a high voltage.

Meanwhile, since the non-conductive resin layer 140 is non-conductive, a short-circuit does not occur even when a gap G between the first resin layer 141 and the second resin layer 142 is small. Therefore, the gap G may be sufficiently reduced to efficiently absorb impacts and suppress propagation of stress. In addition, the gap G may be sufficiently reduced to suppress occurrence of the arc discharge.

The non-conductive resin layer 140, disposed to be in contact with a surface of the body 110, may seal fine pore or cracking of the body 110 to prevent moisture from permeating into the body 110 through am external surface of the body 110.

The first non-conductive resin layer 141 extends between the first conductive resin layer 131b and the first electrode layer 131a of the first band portion B1 to prevent stress from propagating to the body 110 and to prevent cracking.

In addition, the first non-conductive resin layer 141 suppresses lifting between an end of the first electrode layer 131a, disposed in the first band portion B1, and the body 110 to improve moisture resistance reliability.

The second non-conductive resin layer 142 extends between the second conductive resin layer 132b and the second electrode layer 132a of the second band portion B2 to prevent the stress from propagating to the body 110 and to prevent cracking.

In addition, the second non-conductive resin layer 142 suppresses lifting between an end of the second electrode layer 132a, disposed in the second band portion B2, and the body 110 to improve moisture resistance reliability.

When a direction, in which the third surface 3 and the fourth surface 4 of the body 110 oppose each other, is defined as a length direction (an X direction) of the body 110, the first non-conductive resin layer 141 and the second non-conductive resin layer 142 may be spaced apart from each other with a central portion of the body 110 in the length direction (the X direction) interposed therebetween. Such a disposition of the first non-conductive resin layer 141 and the second non-conductive resin layer 142 may allow an arc discharge suppression effect to be significantly improved.

A gap G between the first non-conductive resin layer 141 and the second non-conductive resin layer 142 may be 30% or less of the length of the body 110. When the gap G is greater than 30% of the length of the body 110, an arc discharge suppression effect or a bending strength improvement effect may be insufficient. The length of the body 110 may be a distance between the third and fourth surfaces of the body 110 in the length direction.

A gap G between the first non-conductive resin layer 141 and the second non-conductive resin layer 142 may be less than a gap between the first conductive resin layer 131b and the second conductive resin layer 132b. For example, the sum of a length B1b of the band portion B1 of the first conductive resin layer 131b, a length of the band portion B2 of the second conductive resin layer 132b, and the gap G between the first non-conductive resin layer 141 and the second non-conductive layer 142 may be less than the length of the body 110. When the gap G between the first non-conductive resin layer 141 and the second non-conductive resin layer 142 is greater than or equal to the gap between the first conductive resin layer 131b and the second conductive resin layer 132b, an arc discharge suppressing effect or a bending strength improvement effect may be insufficient.

A lower limit of the gap G is not necessarily limited. However, when a gap G between the first non-conductive resin layer 141 and the second non-conductive resin layer 142, disposed to be in contact with each other, is zero, the stress is not dispersed, and thus, the bending strength improving effect may be insufficient. For example, as the first non-conductive resin layer 141 and the second non-conductive resin layer 142 are spaced apart from each other, the stress may be dispersed to improve the bending strength improvement effect.

Figure 5:
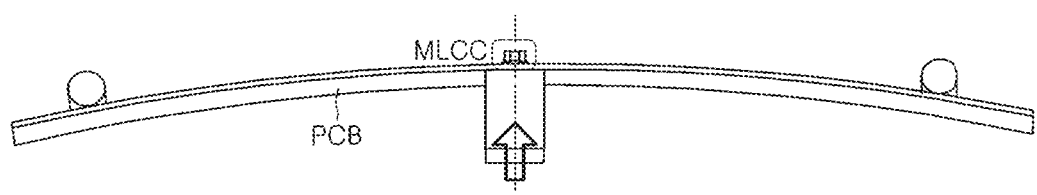
FIG. 5 illustrates a bending test method.

FIG. 5 illustrates a bending test method.

Figure 6:
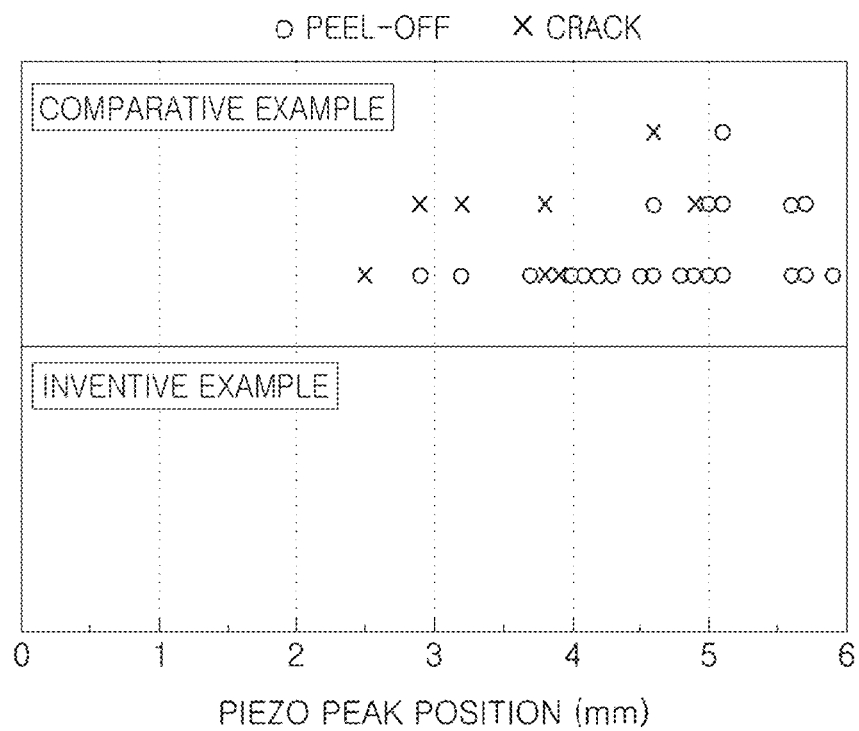
FIG. 6 is a graph illustrating evaluation of bending strength of a multilayer electronic component depending on whether a non-conductive resin of the present disclosure is applied, which shows a bending test result obtained by the test method of FIG. 5.

FIG. 6 is a graph illustrating evaluation of bending strength of a multilayer electronic component depending on whether a non-conductive resin 140 of the present disclosure is applied, which shows a bending test result obtained by the test method of FIG. 5.

In FIG. 6, Comparative Example is a multilayer electronic component to which the non-conductive resin layer 140 is not applied, and Inventive Example is a multilayer electronic component to which the non-conductive resin layer 140 is applied. Thirty samples were prepared for each of Comparative Example and Inventive Example.

Referring to FIG. 5, while mounting a sample chip (MLCC) on a substrate (PCB) and pressing a surface opposing a mounting surface of the sample chip (MLCC) up to 6 mm, a peel-off point (in which an external electrode peels off from a body) and a cracking occurrence point (in which the body is cracked) are shown in FIG. 6 as piezo peak positions.

In Comparative Example, peel-off (an external electrode peels off from a body) or cracking (the body is cracked) occurred in all of the thirty samples. Meanwhile, in the Inventive Example, it can be confirmed that no defect was found in all of the thirty samples, and thus, bending strength can be guaranteed during a bending strength test of 6 mm.

The non-conductive resin layer 140 may be formed by forming first and second electrode layers 131a and 132a in a body 110 including dielectric layers and internal electrodes, forming a non-conductive resin layer on an exposed external surface of the body 110 and the first and second electrode layers 131a and 132a, and removing a non-conductive resin layer formed on connection portions A1 and A2 of the first and second electrode layers 131a and 132a and a non-conductive resin layer formed in a central portion of the body 110 in a length direction.

A method of removing the non-conductive resin layer 140 may be, for example, laser processing, mechanical polishing, dry etching, wet etching, shadowing deposition using a tape protective layer, or the like.

The non-conductive resin layer 140 may include a base resin.

The base resin, included in the non-conductive resin layer 140, is not necessarily limited as long as it has adhesion and impact absorbing properties and may be, for example, an epoxy-based resin.

The non-conductive resin layer 140 may include a base resin, and may include one or more fillers among silica, alumina, glass, and zirconium dioxide ($ZrO_2$).

Silica, alumina, glass, and zirconium dioxide ($ZrO_2$), used as fillers, serve to improve an application shape of the non-conductive resin layer 140. In addition, silica, alumina, glass, and zirconium dioxide ($ZrO_2$) may also serve to improve heat resistance.

In this case, the content of a filler, included in the non-conductive resin layer 140, is not necessarily limited and may be specifically determined in consideration of a type of the filler, type of a resin of the non-conductive resin layer, and an effect desired to be obtained therefrom.

As a detailed example, when a filler of the non-conductive resin layer 140 is silica and a resin of the non-conductive resin layer 140 is an epoxy resin, the content of the filler included in the non-conductive resin layer 140 may be 10% or more by volume, preferably, 20% or more by volume, and more preferably, 40% or more by volume. Therefore, the first non-conductive resin layer 141 may include 10% or more by volume of a filler, and the second non-conductive resin layer 142 may include 10% or more by volume of a filler.

Table 1 shows evaluation of heat resistance of a sample chip including the non-conductive resin layer 140 according to an example after the sample chip was manufactured while varying the content of a filler included in the non-conductive resin layer 140. In the non-conductive resin layer, silica was added to an epoxy resin as a filler. The content of the filler to the entire non-conductive resin layer was represented by volume percent (vol %).

Heat resistance was evaluated by exposing sample chips at temperature of 260° C. for 20 seconds and then checking the degree of deformation of a non-conductive resin layer after exposing the sample chips, as compared with a non-conductive resin layer before exposing the sample chips. In Table 1, X represents a case in which the degree of deformation was 30% or more, Δ represents a case in which the degree of deformation was 10% or more to less than 30%, ○ represents a case in which the degree of deformation was less than 10%, and ⊚ represents a case in which deformation did not occur.

TABLE 1

| Test No. | Filler Content (vol %) | Heat Resistance |
| --- | --- | --- |
| 1* | 0 | X |
| 2* | 5 | X |
| 3 | 10 | Δ |
| 4 | 15 | Δ |
| 5 | 20 | ○ |
| 6 | 25 | ○ |
| 7 | 30 | ○ |
| 8 | 35 | ○ |
| 9 | 40 | ⊚ |

As can be seen from Table 1, in the case of Test Nos. 1 and 2, the content of a filler is less than 10 volume percent and the heat resistance is deteriorated.

Test Nos. 3 to 9 were compared. When a filler included in the non-conductive resin layer is silica and a resin included in the non-conductive resin layer is an epoxy resin, the content of the filler may be, preferably, 10% by volume in terms of heat resistance, may be, more preferably, 20% or more by volume, and may be, further more preferably, 40% or more by volume.

Figure 7:
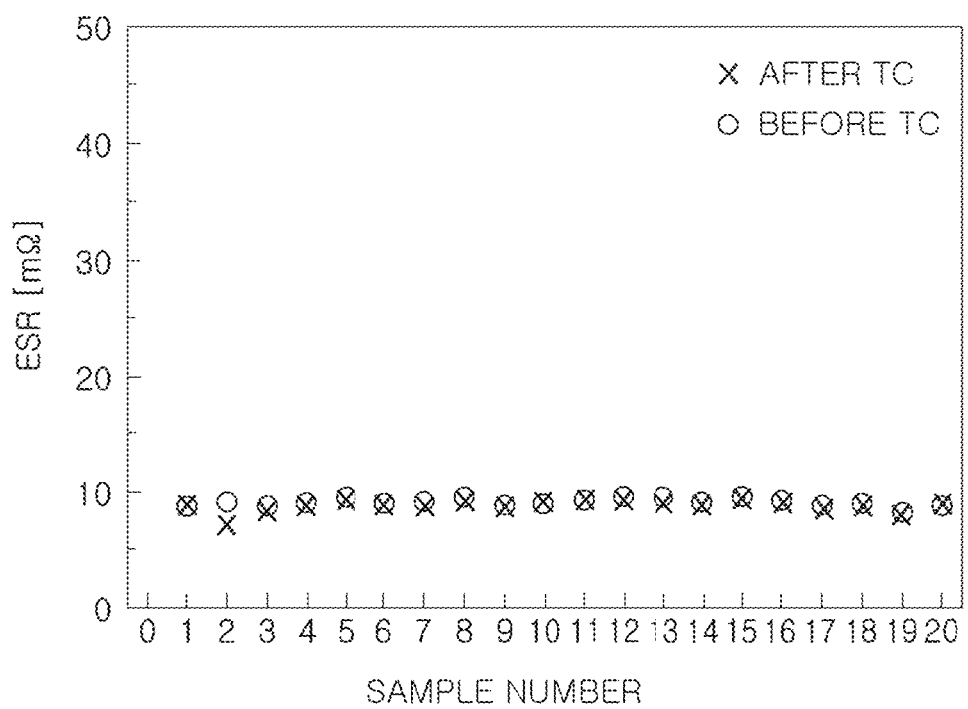
FIG. 7 is a graph illustrating evaluation of ESR after a cycle TC, in which a temperature, changed from −55° C. to 150° C., was repeated 200 times on twenty samples of Test No. 5 of Table 1.

FIG. 7 is a graph illustrating evaluation of ESR after a cycle TC, in which a temperature changed from −55° C. to 150° C., was repeated 200 times on twenty sample chips (sample Nos. 1 to 20) of Test No. 5 in Table 1. As can be seen from FIG. 7, ESR before and after TC were almost similar to each other and heat resistance was improved.

Figure 8:
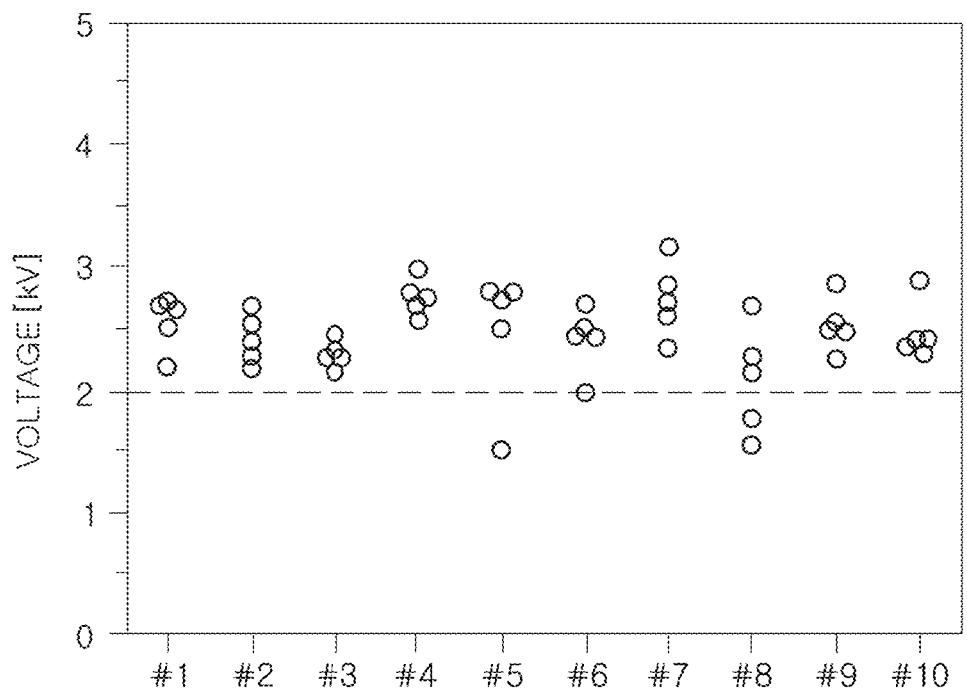
FIG. 8 illustrates an arc discharge occurrence voltage repeatedly measured five times for ten sample chips (#1 to #10) of the Comparative Example in which a non-conductive resin layer is not disposed.

FIG. 8 illustrates an arc discharge occurrence voltage repeatedly measured five times for ten sample chips (#1 to #10) of Comparative Example in which a non-conductive resin layer 140 is not disposed.

Figure 9:
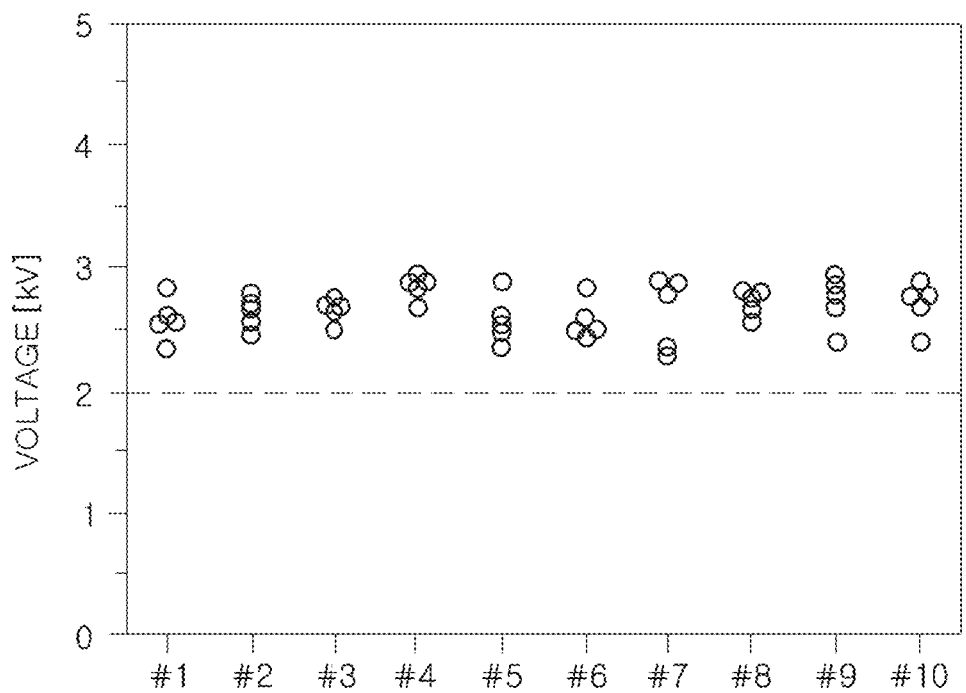
FIG. 9 illustrates an arc discharge occurrence voltage repeatedly measured five times for ten sample chips (#1 to #10) of the Inventive Example in which a non-conductive resin layer is disposed according to an exemplary embodiment of the present disclosure.

FIG. 9 illustrates an arc discharge occurrence voltage repeatedly measured five times for ten sample chips (#1 to #10) of the Inventive Example in which a non-conductive resin layer 140 is disposed, according to an exemplary embodiment.

As can be seen from FIG. 8, since there were four cases in which arc discharge occurred at 2 kV or less, an average value of the arc discharge occurrence voltage was about 2.5 kV.

Meanwhile, as can be seen from FIG. 9, in the case of Inventive Example, arc discharge did not occur at 2.2 kV or less in a total of 50 tests. In addition, an average value of an arc discharge occurrence voltage is was higher than that in Comparative Example and an arc discharge suppression effect was improved.

The first non-conductive resin layer 141 is disposed to cover the first electrode layer 131a of the first corner portion (C1), and the second non-conductive resin layer 142 is disposed to cover the second electrode layer 132a of the second corner portion C2.

When the electrode layers 131a and 132a includes a conductive metal and glass, the electrode layers 131a and 132a of the corner portions C1 and C2, regions between the connection portions A1 and A2 and the band portions B1 and B2, are formed to have high thicknesses, respectively. The corner portions C1 and C2 serve as main moisture permeation paths to deteriorate moisture resistance reliability.

Therefore, the non-conductive resin layer 140 may be disposed to cover the electrode layers 131a and 132a of the corner portions C1 and C2. As a result, the moisture permeation paths may be blocked to improve the moisture resistance reliability.

In addition, the first non-conductive resin layer 141 is disposed to extend to a portion between the first conductive resin layer 131b and the first electrode layer 131a of the first connection portion A1, and the second non-conductive The resin layer 142 extends to a portion between the second conductive resin layer 132b and the second electrode layer 132a of the second connection portion A2. As a result, the moisture permeation path may be more tightly blocked to further improve moisture resistance reliability.

A length of each of the first conductive resin layer 131b of the first band portion B1 and the second conductive resin layer 132b of the second band portion B2 may be 10 to 20% of a length of the body 110.

Referring to FIGS. 2 and 4, a length of a body may refer to a distance between a third surface and a fourth surface of the body, a length of the first conductive resin layer 131b of the first band portion B1 may be a distance B1b from the third surface of the body 110 to an end of the first conductive resin layer 131b, and a length of the second conductive resin layer 132b of the second band portion B2 may be a distance from the fourth surface of the body 110 to an end of the second conductive resin layer 132b.

When the non-conductive resin layer 140 is not disposed, the length of each of the first conductive resin layer 131b of the first band portion B1 and the second conductive resin layer 132b of the second band portion B2 should be maintained at a range of 20 to 30% of the length of the body 110 to secure bending strength.

Meanwhile, when the non-conductive resin layer 140 is disposed according to an exemplary embodiment, sufficient bending strength may be secured even in the case in which the length of each of the first conductive resin layer 131b of the first band portion B1 and the second conductive resin layer 132b of the second band portion B2 is 10 to 20 percent of the length of the body 110. Thus, the arc discharge suppression effect may be further improved.

In order to further improve the bending strength, the distance B1b from the third surface of the body to the end of the first conductive resin layer 131b may be greater than the distance B1a from the third surface of the body to the end of the first electrode layer 131a. Similarly, a distance from the fourth surface of the body to the end of the second conductive resin layer 132b may be greater than a distance from the fourth surface of the body to the end of the second electrode layer 132a.

Figure 10:
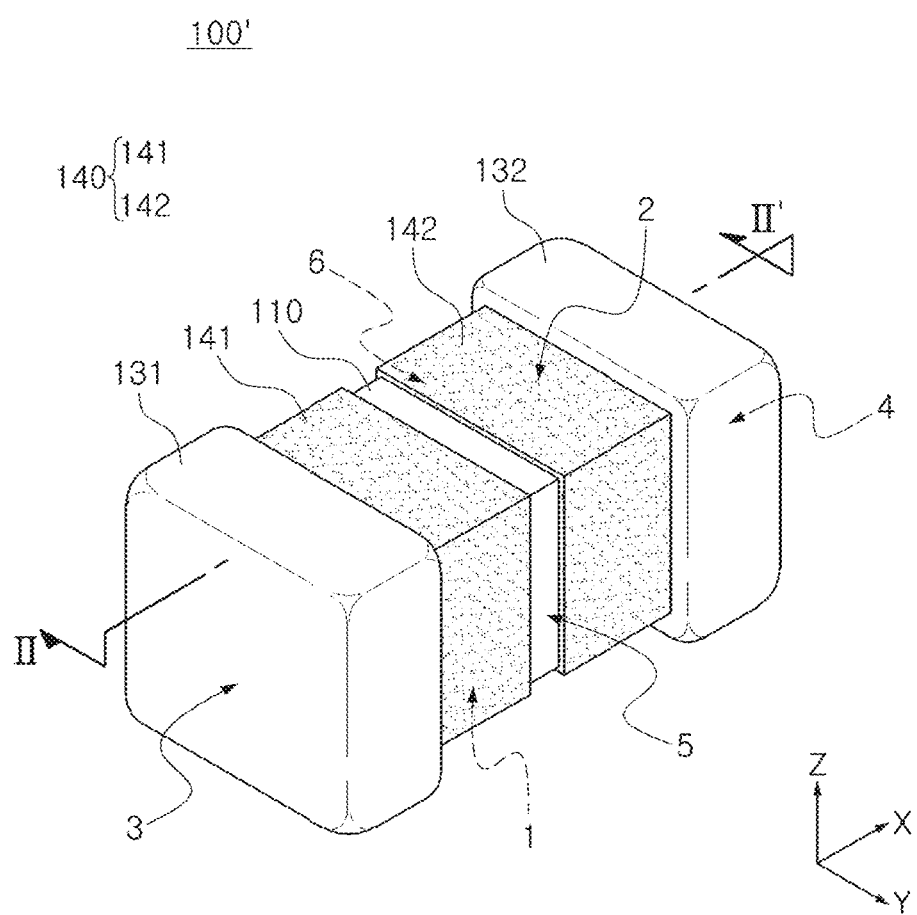
FIG. 10 is a schematic perspective view of a multilayer electronic component according to an exemplary embodiment of the present disclosure.

FIG. 10 is a schematic perspective view of a multilayer electronic component according to an exemplary embodiment of the present disclosure.

Figure 11:
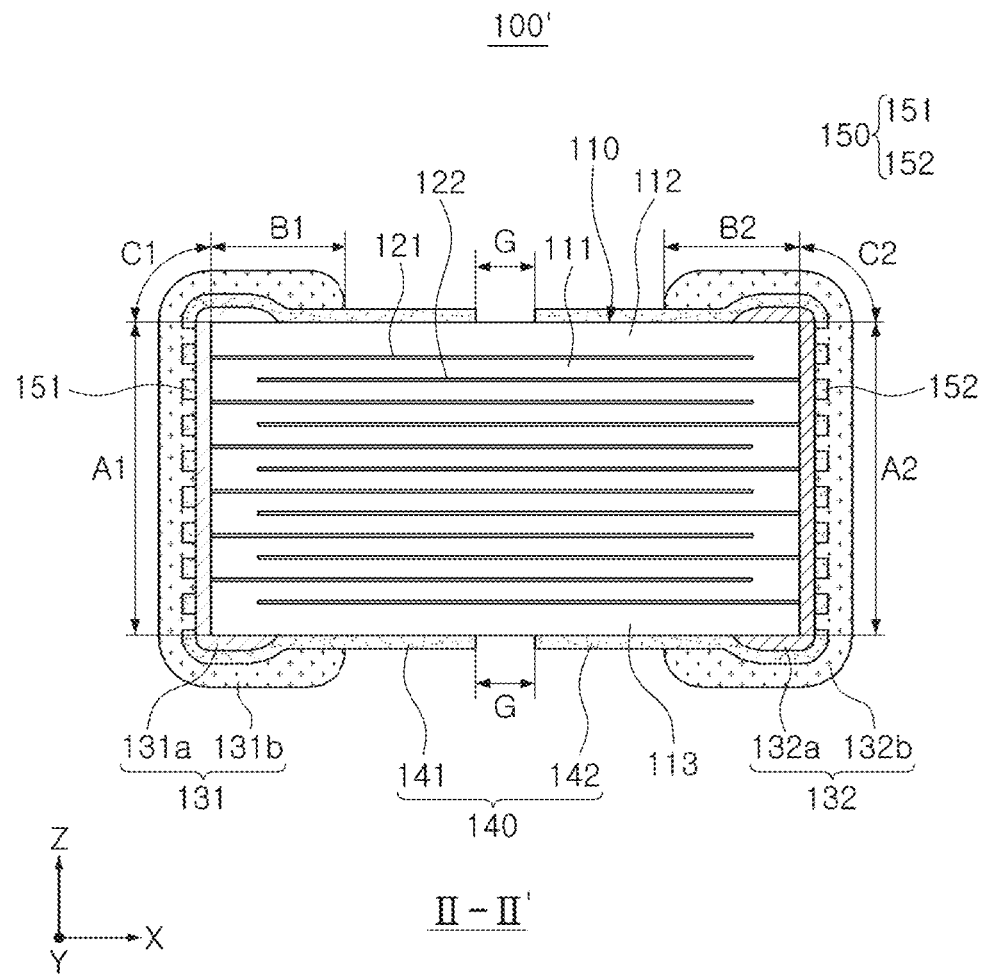
FIG. 11 is a cross-sectional view taken along line II-II' in FIG. 11.

FIG. 11 is a cross-sectional view taken along line II-II' in FIG. 11.

Hereinafter, a multilayer electronic component 100' according to another exemplary embodiment will be described with reference to FIGS. 10 and 11. However, the same descriptions of the multilayer electronic component 100' as those of the multilayer electronic component 100 according to an exemplary embodiment will be omitted to avoid duplicate descriptions.

The multilayer electronic component 100' according to another exemplary embodiment may have a plurality of first and second island-shaped adhesive portions 151 and 152 on a first electrode layer 131a of a first connection portion A1 and a second electrode layer 132a of a second connection portion A2, respectively.

Referring to FIG. 11, the plurality of first and second island-shaped adhesive portions 151 and 152 may be respectively arranged between a first conductive resin layer 131b and a first electrode layer 131a of the first connection portion A1 and between a second conducive resin layer 132b and a second electrode layer 132a of the second connection portion A2.

That is, the first non-conductive resin layer 141 may include one or more first openings through which a portion of the first electrode layer 131a is exposed to the first conductive resin layer 131b, and the second non-conductive resin layer 142 may include one or more second openings through which a portion of the second electrode layer 132a is exposed to the second conductive resin layer 132b. The one or more first openings and the one or more second openings each may include a plurality of discrete openings spaced apart from one another.

The plurality of first and second island-shaped adhesive portions 151 and 152 serve to improve adhesion between the electrode layers 131a and 132a and the conductive resin layers 131b and 132b. As the adhesion between the electrode layers 131a and 132a and the conductive resin layers 131b and 132b is improved, a defect such as electrode lifting may be prevented.

Each of the plurality of first and second island-shaped adhesive portions 151 and 152 may include a base resin.

The base resin, included in the plurality of first and second island-shaped adhesive portions 151 and 152, is not necessarily limited as long as it has an adhesive property and impact absorption and may be, for example, an epoxy resin.

In addition, the plurality of first and second island-shaped adhesive portions 151 and 152 may include a base resin, and may include at least one of silica, alumina, glass, or zirconium dioxide ($ZrO_2$). Silica, alumina, glass, and zirconium dioxide ($ZrO_2$) serve to improve an applying shape and to improve heat resistance.

The plurality of first and second island-shaped adhesive portions 151 and 152 may be formed by forming first and second electrode layers 131a and 132a in a body 110 including dielectric layers and internal electrodes, forming a non-conductive resin layers on an exposed external surfaces of the body 110 and the first and second electrode layers 131a and 132a, and removing only a portion of the non-conductive resin layer 140 formed on the connection portions A1 and A2 of the first and second electrode layers 131a and 132a.

Therefore, the plurality of first and second island-shaped adhesive portions 151 and 152 may be formed of the same material as the first and second non-conductive resin layers 140.

A collective area of the plurality of first island-shaped adhesive portions 151 and a collective area of the plurality of second island-shaped adhesive portions 152 may be 20 to 40 percent of an area of the first electrode layer 131a of the first connection portion A1 and an area of the second electrode layer 132a of the second connection portion A2, respectively.

Table 2 shows evaluation results of ESR and adhesion depending on a ratio of an area S2 of the adhesive portion to an area S1 of the electrode layer of the connection portion (S2/S1).

The adhesion was evaluated by measuring energy using a bond tester when a conductive resin layer is separated falls from an electrode layer. As compared with a case in which the area S2 of the adhesive portion is 0, Δ represents a case in which an adhesion improvement effect was less than 5%, ○ represents a case in which the adhesion improvement effect was 5% or more to 20% or less, and ⊚ represents a case in which the adhesion improvement effect was 20% or more.

ESR evaluation was performed by measuring ESR of 100 samples at a self-resonant frequency using an LCR meter. In Table 2, Δ represents a case in which a coefficient of variation (CV) was more than or equal to 10%, ○ represents a case in which the CV was 3% or more to less than 10%, and ⊚ represents a case in which the CV was less than 3%.

TABLE 2

| Test No. | S2/S1 | ESR | Adhesion |
|---|---|---|---|
| 10 | 0.1 | ⊚ | Δ |
| 11 | 0.2 | ○ | ○ |
| 12 | 0.3 | ○ | ○ |
| 13 | 0.4 | ○ | ○ |
| 14 | 0.5 | Δ | ⊚ |

As can be seen from Table 2, in the case of Test No. 10 in which the ratio of the area S2 of the bonding portion to the area S1 of the electrode layer of the connection portion (S2/S1) is 0.1, ESR characteristics are improved but adhesion is deteriorated.

In the case of Test No. 10 in which the ratio of the area S2 of the bonding portion to the area S1 of the electrode layer of the connection portion (S2/S1) is 0.5, adhesion is improved but ESR characteristics are deteriorated.

Accordingly, the area of each of the plurality of first and second island-shaped adhesive portions 151 and 152 is set to, for example, 20 to 40 percent of the area of the first electrode layer 131a of the first connection portion A1 or the area of the second electrode layer 132a of the second connection portion A2. As a result, both improved adhesion and improve ESR characteristics may be secured.

As described above, a first non-conductive resin layer, extending between a conductive resin layer and an electrode layer of a first external electrode, and a second non-conductive resin layer, extending between a conductive resin layer and an electrode layer of a second external electrode, may be spaced apart from each other to suppress arc discharge and to improve bending strength.

In addition, a filler may be added to the first and second non-conductive resin layers to improve heat resistance.

While embodiments have been shown and described above, it will be apparent to those skilled in the art that modifications and variations could be made without departing from the scope of the present disclosure as defined by the appended claims.

What is claimed is:

1. A multilayer electronic component comprising:
   a body including dielectric layers, and first and second internal electrodes alternately stacked with respective dielectric layers interposed therebetween, and having first and second surfaces opposing each other in a stacking direction, third and fourth surfaces connected to the first and second surfaces and opposing each other, and fifth and sixth surfaces connected to the first to fourth surfaces and opposing each other;
   a first external electrode including a first electrode layer connected to the first internal electrode and a first conductive resin layer disposed on the first electrode layer, and having a first connection portion disposed on the third surface of the body and a first band portion extending from the first connection portion along a portion of each of the first, second, fifth, and sixth surfaces;
   a second external electrode including a second electrode layer connected to the second internal electrode and a second conductive resin layer disposed on the second electrode layer, and having a second connection portion disposed on the fourth surface of the body and a second band portion extending from the second connection portion along a portion of each of the first, second, fifth, and sixth surfaces; and
   a first non-conductive resin layer and a second non-conductive resin layer disposed on the first, second, fifth, and sixth surfaces and spaced apart from each other,
   wherein the first non-conductive resin layer extends between the first conductive resin layer and the first electrode layer of the first band portion, and the second non-conductive resin layer extends between the second conductive resin layer and the second electrode layer of the second band portion,
   wherein, when a direction in which the third surface and the fourth surface of the body oppose each other is defined as a length direction of the body, a length of the first conductive resin layer of the first band portion and a length of the second conductive resin layer of the second band portion each are 10 to 20 percent of a length of the body in the length direction,
   wherein a plurality of first and second island-shaped adhesive portions are disposed on the first electrode layer of the first connection portion and the second electrode layer of the second connection portion, respectively, and
   wherein each of the plurality of first and second island-shaped adhesive portions includes a base resin.

2. The multilayer electronic component of claim 1, wherein each of the first and second non-conductive resin layers includes a base resin, and includes one or more fillers among a group consisting of silica, alumina, glass, and zirconium dioxide (ZrO2).

3. The multilayer electronic component of claim 1, wherein each of the first and second non-conductive resin layers includes an epoxy resin and silica, and the content of the silica is 10 volume percent or more.

4. The multilayer electronic component of claim 1, wherein, the first non-conductive resin layer and the second non-conductive resin layer are spaced apart from each other in the length direction with a central portion of the body in the length direction interposed therebetween.

5. The multilayer electronic component of claim 1, wherein each of the first and second conductive resin layers includes a conductive metal and a base resin.

6. The multilayer electronic component of claim 1, wherein each of the first and second conductive resin layers includes a plurality of metal particles, an intermetallic compound, and a base resin.

7. The multilayer electronic component of claim 6, wherein the plurality of metal particles include at least one of silver (Ag), nickel (Ni), or copper (Cu), and
the intermetallic compound includes at least one of Ag3Sn, Ni3Sn4, Cu6Sn5, or Cu3Sn.

8. The multilayer electronic component of claim 1, wherein, when a portion between the first connection portion and the first band portion is defined as a first corner portion and a portion between the second connection portion and the second band portion is defined as a second corner portion, the first non-conductive resin layer is disposed to cover the first electrode layer of the first corner portion and the second non-conductive resin layer is disposed to cover the second electrode layer of the second corner portion.

9. The multilayer electronic component of claim 1, wherein the first non-conductive resin layer extends to a portion between the first conductive resin layer and the first electrode layer of the first connection portion, and
the second non-conductive resin layer extends to a portion between the second conductive resin layer and the second electrode layer of the second connection portion.

10. The multilayer electronic component of claim 1, wherein each of the plurality of first and second island-shaped adhesive portions further includes at least one of silica, alumina, glass, or zirconium dioxide (ZrO2).

11. The multilayer electronic component of claim 1, wherein each of the plurality of first and second island-shaped adhesive portions includes a same material as the first and second non-conductive resin layers.

12. The multilayer electronic component of claim 1, wherein a collective area of the plurality of first island-shaped adhesive portions and a collective area of the plurality of second island-shaped adhesive portions are 20 to 40 percent of an area of the first electrode layer of the first connection portion and an area of the second electrode layer of the second connection portion, respectively.

13. The multilayer electronic component of claim 1, wherein, in regions of the first and second connection portions corresponding to the third and fourth surfaces of the body,
a portion of the first electrode layer is in contact with the first conductive resin layer through an opening of the first non-conductive resin layer, and a portion of the second electrode layer is in contact with the second conductive resin layer through an opening of the second non-conductive resin layer.

14. A multilayer electronic component comprising:
a body including dielectric layers, and first and second internal electrodes alternately stacked with respective dielectric layers interposed therebetween, and having first and second surfaces opposing each other in a stacking direction, third and fourth surfaces connected to the first and second surfaces and opposing each other, and fifth and sixth surfaces connected to the first to fourth surfaces and opposing each other;
a first external electrode including a first electrode layer connected to the first internal electrode and a first conductive resin layer disposed on the first electrode layer;
a second external electrode including a second electrode layer connected to the second internal electrode and a second conductive resin layer disposed on the second electrode layer; and
a first non-conductive resin layer and a second non-conductive resin layer disposed on the first, second, fifth, and sixth surfaces and spaced apart from each other,
wherein the first non-conductive resin layer extends between the first conductive resin layer and the first electrode layer, and the second non-conductive resin layer extends between the second conductive resin layer and the second electrode layer,
wherein the first non-conductive resin layer includes one or more first openings through which a portion of the first electrode layer is exposed to the first conductive resin layer, and the second non-conductive resin layer includes one or more second openings through which a portion of the second electrode layer is exposed to the second conductive resin layer,
wherein the one or more first openings and the one or more second openings each include a plurality of discrete openings spaced apart from one another,
wherein a plurality of first and second island-shaped adhesive portions are disposed on the first electrode layer of the first external electrode and the second electrode layer of the second external electrode, respectively, and
wherein each of the plurality of first and second island-shaped adhesive portions includes a base resin.

15. The multilayer electronic component of claim 14, wherein the one or more first openings and the one or more second openings are arranged in only regions corresponding to the third and fourth surfaces of the body, respectively.

* * * * *